United States Patent
Amos et al.

(10) Patent No.: US 9,438,372 B2
(45) Date of Patent: Sep. 6, 2016

(54) DEVICE AND METHOD FOR NEUTRALIZING THE IMPACT OF A JAMMING SIGNAL ON A SATELLITE

(71) Applicant: EUTELSAT S A, Paris (FR)

(72) Inventors: Sonya Amos, Paris (FR); Hector Fenech, Issy-les-Moulineaux (FR)

(73) Assignee: EUTELSAT S A, Paris (FR)

( * ) Notice: Subject to any disclaimer, the term of this patent is extended or adjusted under 35 U.S.C. 154(b) by 0 days.

(21) Appl. No.: 14/678,019

(22) Filed: Apr. 3, 2015

(65) Prior Publication Data

US 2015/0288481 A1 Oct. 8, 2015

(30) Foreign Application Priority Data

Apr. 4, 2014 (EP) .................................. 14305497

(51) Int. Cl.
*H04B 1/60* (2006.01)
*H04K 3/00* (2006.01)
*H04B 7/185* (2006.01)

(52) U.S. Cl.
CPC ............ *H04K 3/28* (2013.01); *H04B 7/18517* (2013.01); *H04B 7/18519* (2013.01); *H04K 3/224* (2013.01); *H04K 3/228* (2013.01); *H04K 2203/14* (2013.01); *H04K 2203/36* (2013.01)

(58) Field of Classification Search
CPC .......... H04B 7/18517; H04B 7/18519; H04K 3/224; H04K 3/228; H04K 3/28
USPC ........ 455/9, 12.1, 296, 456.1, 456.3, 1, 403, 455/150.1, 307, 232.1, 278.1, 63.1; 342/16, 342/357.59, 450, 383, 357.72, 357.12, 21, 342/417, 14, 357.02, 13, 15; 375/350, 346
See application file for complete search history.

(56) References Cited

U.S. PATENT DOCUMENTS

| | | | | |
|---|---|---|---|---|
| 5,020,411 A | * | 6/1991 | Rowan | F02G 1/043 376/319 |
| 5,655,019 A | * | 8/1997 | McKernan | H04K 3/28 380/247 |
| 6,704,557 B1 | * | 3/2004 | Krishnamurthy | H01Q 3/2611 342/368 |
| 6,710,739 B1 | * | 3/2004 | Loegering | G01S 19/21 342/357.31 |
| 6,771,220 B1 | * | 8/2004 | Ashe | G01S 19/21 342/14 |
| 6,825,804 B1 | * | 11/2004 | Doty | F41G 7/346 342/357.59 |
| 6,961,017 B1 | * | 11/2005 | Naylor | G01S 19/21 342/16 |
| 2002/0012411 A1 | * | 1/2002 | Heinzl | G01S 19/21 375/350 |
| 2002/0053989 A1 | * | 5/2002 | Lin | G01S 19/015 342/357.59 |

(Continued)

FOREIGN PATENT DOCUMENTS

WO WO 2013/181762 A1 12/2013

OTHER PUBLICATIONS

Extended European Search Report as issued in European Patent Application No. EP 14305497.1, dated Dec. 22, 2014.

(Continued)

*Primary Examiner* — Tan H Trinh
(74) *Attorney, Agent, or Firm* — Pillsbury Winthrop Shaw Pittman LLP

(57) ABSTRACT

A device and method for neutralizing the effect of a jamming signal on a satellite. The device is configured to be on the ground and it includes an identification device configured to determine parameters of the jamming signal; a processor configured to generate a replica of the jamming signal; an emitter configured to broadcast the replica of the jamming signal on the uplink of the satellite.

14 Claims, 1 Drawing Sheet

(56) References Cited

U.S. PATENT DOCUMENTS

| | | | | |
|---|---|---|---|---|
| 2003/0054755 A1* | 3/2003 | Zehavi | H04K 3/228 | 455/1 |
| 2004/0209626 A1* | 10/2004 | Fitzrandolph | G01S 19/21 | 455/456.1 |
| 2005/0001754 A1* | 1/2005 | Sparrow | G01S 7/38 | 342/13 |
| 2005/0159891 A1* | 7/2005 | Cohen | G01S 19/06 | 701/470 |
| 2008/0169958 A1* | 7/2008 | Cohen | G01S 19/015 | 342/14 |
| 2010/0201570 A1* | 8/2010 | Shemar | G01S 19/21 | 342/357.59 |
| 2010/0265116 A1* | 10/2010 | Kasperkovitz | G01S 7/36 | 342/16 |
| 2010/0289688 A1* | 11/2010 | Sherman | H04K 3/228 | 342/16 |
| 2012/0313817 A1* | 12/2012 | Underbrink | G01S 19/37 | 342/357.72 |
| 2013/0023201 A1* | 1/2013 | Coleman | H04K 3/45 | 455/1 |
| 2013/0328711 A1* | 12/2013 | Fenton | G01S 19/21 | 342/16 |
| 2014/0038541 A1* | 2/2014 | Reiss | H04K 3/22 | 455/296 |
| 2014/0125520 A1* | 5/2014 | Fenton | H01Q 3/2629 | 342/357.59 |
| 2014/0141737 A1* | 5/2014 | Kasperkovitz | H04K 3/228 | 455/150.1 |
| 2014/0145877 A1* | 5/2014 | Arcidiacono | G01S 19/05 | 342/357.42 |
| 2014/0218240 A1* | 8/2014 | Kpodzo | G01S 5/0215 | 342/450 |
| 2014/0266851 A1* | 9/2014 | Fink | G01S 19/015 | 342/14 |
| 2015/0123843 A1* | 5/2015 | Lier | H04K 3/20 | 342/352 |
| 2015/0126181 A1* | 5/2015 | Breuer | H04K 3/222 | 455/423 |
| 2015/0131523 A1* | 5/2015 | Balter | H04B 1/715 | 370/317 |
| 2015/0131703 A1* | 5/2015 | Balter | H04B 1/715 | 375/133 |

OTHER PUBLICATIONS

W. Hreha et al., "Commercial SATCOM Communications Protection: Commercial SATCOM Resilience to Jamming," The 2011 Military Communications Conference—Track 6—Department of Defense Programs; IEEE 2011, pp. 2302-2306.

\* cited by examiner

DEVICE AND METHOD FOR NEUTRALIZING THE IMPACT OF A JAMMING SIGNAL ON A SATELLITE

CROSS REFERENCE TO RELATED APPLICATIONS

This application claims the benefit of priority from European Patent Application No. 14305497.1 filed on Apr. 4, 2014, the entire content of which is incorporated herein by reference.

FIELD

The present invention relates to a device and method for neutralizing the impact of a jamming signal on a satellite.

BACKGROUND

Interference is becoming of greater significance, both intentional and unintentional as technology becomes more advanced, available and as the amount of traffic increases. Interference on a broadcast system can have significant impact potentially blocking and denying the service.

Document US2010/0265116 describes an earth receiving station comprising:
- an earth receiving station that is configured to receive an input signal and produce therefrom a baseband signal;
- a earth receiving station that is configured to detect a jamming signal in the input signal at a jamming frequency;
- a replica signal generator that is configured to generate a replica jamming signal at the jamming frequency, and
- a combiner that is configured to combine the input signal and the replica jamming signal so as to substantially cancel effects of the jamming signal on the baseband signal.

Consequently, according to this document, the earth receiving station is provided with an anti-jamming system comprising the replica signal generator and the combiner. This anti-jamming signal enables to decrease the effect of a jamming signal on the input signal received by the earth receiving station. However, according to this document, each earth receiving station has to be provided with an anti-jamming system to be "protected" against the jamming signals. Consequently, the anti-jamming system is integrated to each earth receiving station, which is very expensive. Besides, the anti-jamming system is configured according to the earth receiving station inside which it is integrated, which is very complex when there are a wide range of earth receiving station categories. Moreover, the anti-jamming system of this document enables to diminish the impact of the interference on the earth receiving station, but the interference has still an impact on the power of the earth receiving station signal.

US2010/0289688 describes a method of providing a signal 180° out of phase with a jamming signal such that the effect of the jamming signal is cancelled or substantially reduced at the earth receiving station level. This method and device is applied to a military environment in which personnel communicate using Talk While You Jam TWYJ radios in which the radios are required to jam both 'friendly' jamming signal and enemy signals. The radios of this document are intended to be provided with a database of known enemy jamming waveforms and have signal processing components that enable the radios to detect and classify received enemy jamming signals. The processing is performed at the earth receiving station such that it is able to decode information from a second signal received on the same channel as a known waveform. When in receive mode the radio emits a jamming cancellation signal. However, the arrangement described in this document could not be applied to a satellite broadcast system in which the signals are transmitted to a wide coverage region.

Other methods of the prior art suggests to provide satellites with on-board anti-jamming systems. However, such systems are very expensive, not applicable to the satellites already in operation and once again they must be adapted to each type of satellite inside which they are integrated.

More generally, the anti-jamming systems of the prior art focus on mitigation of Adjacent Satellite Interference through multiple earth receiving stations and signal processing techniques.

SUMMARY

An aspect of the invention aims at providing a device and method of counter-acting from the ground intentional and unintentional interference so that the service can be restored at the satellite level while maintaining the use of the standard user earth receiving stations with no modifications. The solution is therefore not limited to intentional interference and can be applied to any interference which is seen as a significant noise on the signal.

Another aspect of the invention is directed to an anti-jamming system that can be efficient on several satellites and/or on several earth receiving stations, without requiring any modification or addition of technical means on these satellites and/or earth receiving stations.

Another aspect of the invention is directed to a de-jamming station and method that have no impact on noise and power of the uplink and downlink signals going to and coming from the satellite.

Another impact of the invention is to provide an anti-jamming system and method that have no impact on the cost or on the mass of a specific satellite or of a specific earth receiving station.

To that purpose, a first aspect of the invention concerns a de-jamming station for neutralizing the impact of a jamming signal on a satellite, the de-jamming station being configured to be on the ground, the de-jamming station comprising;
- an identification device configured to determine parameters of the jamming signal;
- a processor configured to generate a replica of the jamming signal;
- an emitter configured to broadcast the replica of the jamming signal on the uplink of the satellite.

The de-jamming station according to an embodiment of the invention is intended to be on ground and to broadcast the replica of the jamming signal from the ground on the uplink of the satellite with the appropriate phasing. Consequently, the same de-jamming station may be used to neutralize the impact of a jamming signal on a wide range of satellites. Moreover, in contrast to de-jamming stations of the prior art that are integrated in one specific earth receiving station and that analyze the jamming signal once it is integrated in the input signal received by the earth receiving station, the de-jamming station according to an embodiment of the invention is independent of the earth receiving stations and it directly analyzes the jamming signal before it is integrated into the input signal of a earth receiving station.

The signal processing is consequently simpler than according to the prior art and it is common to all earth receiving stations.

The device according to an embodiment of the invention may also comprise one or several of the following features taken individually or according to all possible technical combinations.

Beneficially, the de-jamming station comprises a receiver configured to receive a downlink signal emitted by the satellite. Consequently, the downlink signal emitted by the satellite is used by the de-jamming station to analyze the jamming signal and to generate the replica of the jamming signal.

Beneficially, the identification device comprises a monitoring device configured to identify a level and a frequency of the jamming signal contained in the downlink signal. The knowing of the level and frequency of the jamming signal are used to isolate the jamming signal in the downlink signal in order to generate the replica of the jamming signal with the appropriate phasing.

Beneficially, the identification device further comprises a characterization device configured to identify the nature of the jamming signal contained in the downlink signal. By "nature" of the jamming signal, it is meant its form, e.g. if it is stationary or sweeping. The knowledge of the nature of the jamming signal is used to isolate the jamming signal in the downlink signal in order to generate the replica of the jamming signal.

Beneficially, the identification device comprises an isolating device configured to isolate the jamming signal contained in the received downlink signal.

Beneficially, the processor is configured to generate a replica of the jamming signal having the same frequency and amplitude as the jamming signal and being opposite in phase with the jamming signal.

Another aspect of the invention concerns a method for neutralizing from the ground the impact of a jamming signal on a satellite, the method comprising:

Identifying parameters of the jamming signal;

Generating a replica of the jamming signal;

Emitting the replica of the jamming signal from the ground on the uplink of the satellite.

The method according to an embodiment of the invention may also comprise one or several of the following features taken individually or according to all possible technical combinations.

The method may further comprise a step of receiving the downlink signal emitted by the satellite.

The method may further comprise a step of optimizing the replica of the jamming signal generated in order to minimize the jamming signal contained in the downlink signal emitted by the satellite.

The identifying step may comprise a step of determining a level, a frequency and phase of the jamming signal contained in the downlink signal.

The identifying step may comprise a step of determining the nature of the jamming signal contained in the downlink signal.

The identifying step may comprise a step of isolating the jamming signal contained in the downlink signal.

The replica of the jamming signal may have the same frequency and amplitude as the jamming signal and be opposite in phase with the jamming signal.

DETAILED DESCRIPTION

Figure 1:
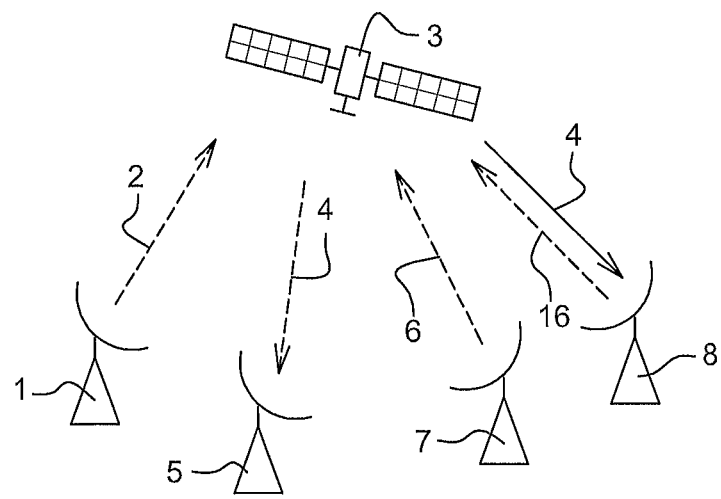
FIG. 1 schematically represents a communication system according to an embodiment of the invention.

With reference to FIG. 1, satellite broadcasting systems such as Direct-to-Home (DTH) involve the distribution of television signals from high-powered satellites to small dish antennas located at the users home. Positioned in a geostationary orbit, the satellite transmission is able to cover a wide region, often including remote areas that would not easily be served by a terrestrial system.

To that purpose, earth emitting station 1 send a wanted uplink signal 2 $s_W(t)$ to a satellite 3. The satellite 3 may then amplify the received uplink signal 2, sort the input signals and direct the output signals through input/output signal multiplexers to the proper downlink antennas for retransmission of a wanted downlink signal 4 to earth receiving stations 5.

In case of jamming signal 6 $s_J(t)=A \cdot \sin(\omega_J t)$, either intentional or un-intentional, send by an interferer station 7, the uplink signal received by the satellite 3 is not $s_W(t)$ but $s_U(t)=s_W(t)+A \cdot \sin(\omega_J t)$.

The ratio of the wanted uplink signal C to the interfering uplink signal J can be expressed as $$\frac{C}{J} = \frac{|\hat{s}_W(t)|^2}{2A^2}$$

There are two effects that can be of significance on the downlink signal 4:

The interfering signal itself

Power robbing; the presence of the interfering signal means that the total power of the TWTA that is delivered is an amount of C+J, so that the actual portion of the power of the signal (C) is reduced.

An aspect of the invention proposes a device 8 and method for neutralising the effect of the interference by introducing a replica signal on the uplink of the satellite, i.e. from the ground to the spacecraft. The replica is such that the required amplitude and phase at the spacecraft payload input of the satellite is as close as possible to the wanted uplink signal, effectively suppressing the effect of the jamming signal.

Figure 2:
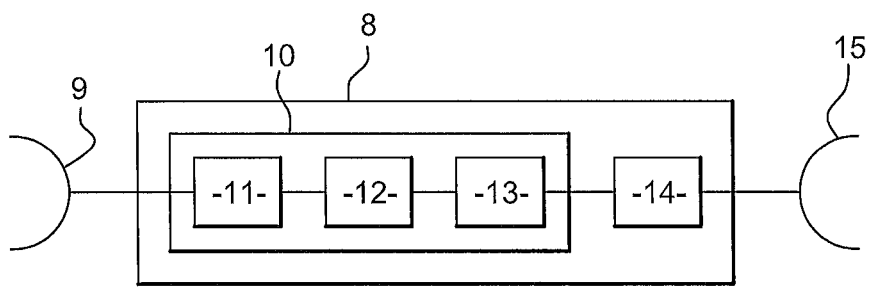
FIG. 2 represents a de-jamming station according to an embodiment of the invention.

FIG. 2 represents a de-jamming station 8 according to an embodiment of the invention. This de-jamming station 8 comprises:

a receiver configured to receive the downlink signal 4 send by the satellite 3;

an identification device 10 configured to identify parameters of the jamming signal $s_J(t)=A \cdot \sin(\omega_J t)$. The identification device 10 may comprise a monitoring device 11 configured to identify a level and frequency of the jamming signal and characterization means 12 configured to identify the nature of the jamming signal. The identification device may further comprises an isolating device 13 configured to isolate the jamming signal in the downlink signal.

a processor 14 configured to generate a replica $s_R(t)=B\cdot\sin(\omega_{DJ}t+\phi)$ of the jamming signal;

an emitter 15 configured to broadcast the replica $s_R(t)=B\cdot\sin(\omega_{DJ}t+\phi)$ of the jamming signal on the uplink of the satellite.

The signal at the payload input of the satellite now becomes:

$$s_{R1}(t)=s_W(t)+A\cdot\sin(\omega_J t)-B\cdot\sin(\omega_{DJ}t+\phi)$$

Since in principle $\omega_{DJ}$ should be as close as possible to $\omega_J$ one can express $\omega_{DJ}$ as $$\omega_{DJ}=\omega_J\delta\omega$$

And one can rewrite the expression to at the payload input as:

$$s_U(t)=s_W(t)+A\cdot\sin(\omega_J t)-B\cdot\sin((\omega_J+\delta\omega)t+\phi)$$

The objective is for the received signal to equal the wanted signal only i.e. $s_U(t)=s_W(t)$ when $|A-B|$, $\delta\omega$ and $\phi$ are all equal to zero. An algorithm can be used to minimise these terms. The key factor is the $|A-B|$ term and requires that the de-jamming station have an equivalent isotropically radiated power (EIRP) of similar magnitude to that of the Interfering station.

The following section describes the method according to an embodiment of the invention, performed by the de-jamming station of FIG. 2.

The method comprises first a step of receiving the downlink signal emitted by the satellite. The downlink signal contains the jamming signal.

Figure 3:
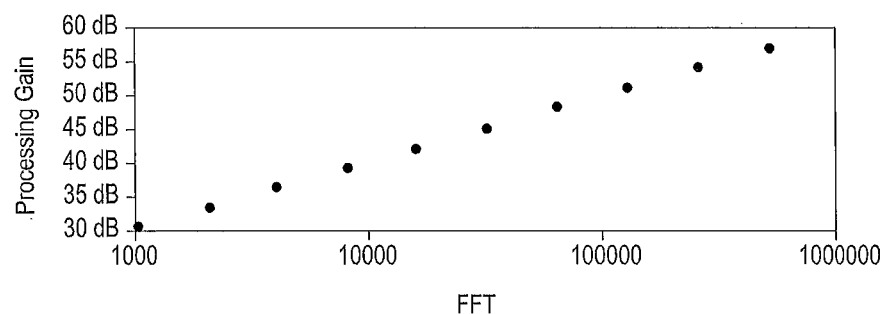
FIG. 3 represents the processing gain for a jamming carrier with respect to an evenly spread signal over 36 MHz.

The method comprises then a step of determining the level and frequency of the jamming signal contained in the downlink signal. This step is performed by the monitoring device 11. For example, this step could be performed through a Fast Fourier Transform (FFT). This allows to calculate the processing gain required. With reference to FIG. 3, defining the processing gain as the power ratio between a jamming carrier and an evenly spread signal over 36 MHz, it will be seen that even with moderately sized FFT, for example 1024, we would have a processing gain of 30 dB. That means that if the power levels for both signals are equal, the jamming signal will produce a contribution which is 30 dB higher than the others.

The method comprises then a step of characterisation wherein the nature of the jamming signal is determined. By "determining the nature of the signal", it is meant determining the stability of the signal, if the signal is stationary or sweeping. More precisely, to determine the nature of the jamming signal, a number of measurements may be performed to measure how stable to signal is, whether it is moving, and potentially at what rate.

This received downlink signal is then filtered by an isolating device 13 to ensure a good processing gain. The filtered signal is then fed to processor enabling to generate a replica of the jamming signal. The processor may comprise a phase lock loop PLL. The filtering should be narrow enough such that when the jamming signal is suppressed, there remains sufficient signal for the Phase Lock Loop PLL to function. An example could be taken if one aims for a 35 dB interference suppression and allows 15 dB signal to noise ratio (S/N) for the PLL, then one would require 50 dB processing gain resulting in a filter bandwidth of 330 Hz. If the objective is increased to 40 dB for the interference suppression and maintained the 15 dB S/N for the PLL then one would require 65 dB processing gain and a filter bandwidth of 10 Hz.

Once the jamming signal is identified and cleaned, the jamming signal can be fed to the processor. More precisely, the jamming signal is first fed to the PLL to generate a carrier at the same frequency as the jamming signal. It should be noted that this step may not be needed if the filter bandwidth is sufficiently narrow.

In order to maintain maximum sensitivity and noise immunity, the filter centre frequency is adjusted.

The steps summarised above have made it possible to produce a carrier with the same frequency as the jamming signal. However, since the propagation delay includes several wavelengths of the frequency of the jamming signal, it is not possible to accurately reproduce the required phase shift at the payload input. In a worst case scenario the jamming signal and its replica could add in phase within the vector addition and lead to a 6 dB overdrive. To limit the potential overdrive to 2 dB the de-jammer uplink EIRP is initially reduced by 12 dB with respect to the required estimate.

For completely effective cancellation the signals should be in anti-phase at the payload input. Once the estimate of the jamming signal has been established, a phase shift is introduced. The phase shift is then optimised to minimise the received downlink signal at the interfering frequency.

For imperfect phasing but perfect amplitude, the resulting replica is given as:

$$\sin(\omega\cdot t+\varphi)-\sin(\omega\cdot t+\varphi)=2\cdot\cos\left(\omega\cdot t+\frac{\varphi}{2}\right)\cdot\sin\left(\frac{\varphi}{2}\right)$$

For a given suppression, $G_P$, and small phasing errors the phase difference is expressed as $$\varphi_0=\frac{180}{\pi}10^{G_P/20}$$

Thus in order to maintain the contributions from phase uncertainties to below 45 dB to 55 dB, the phase tracking has to be within less than 0.3° to 0.1°.

Following the phase tracking, the replica EIRP is then increased to the estimated required level. For a given suppression, $2G_P$, the EIRP difference between the replica and the received downlink signal level can be expressed as:

$$|EIRP_{DJ}-EIRP_J|=20.\log_{10}(1+10^{G_P/20})$$

Thus continuing the example above, in order to maintain the contributions from phase uncertainties to below 45 dB to 55 dB, the phase tracking has to be within less than 0.05 dB to 0.015 dB.

The signal is then corrected for small variations in frequency, amplitude and phase.

Once the replica of the jamming signal has been determined, the de-jamming station emits this replica on the uplink of the satellite. This emission of the replica enables to neutralize the effects of the jamming signal.

While the present invention has been particularly described with reference to the preferred embodiments, it should be readily apparent to those of ordinary skill in the art that changes and modifications in form and details may be made without departing from the scope of the invention.

Having described and illustrated the principles of the invention with reference to various embodiments, it will be recognized that the various embodiments can be modified in arrangement and detail without departing from such principles. It should be understood that the different devices, systems, modules, transmitters, receivers, programs, processes, or methods described herein, and more generally any elements of the de-jamming station, including the elements of the identification device, processor and emitter, described herein are not related or limited to any particular type of computing environment, unless indicated otherwise. Various types of specialized computing environments may be used with or perform operations in accordance with the teachings described herein, Elements of embodiments shown in software may be implemented in hardware and vice versa.

One or more devices, processors or processing devices may be configured to carry out the function(s) of each of the elements and modules of the structural arrangement, including the elements of the de-jamming station, including the elements of the identification device, processor and emitter, described herein. For example, the one or more devices, processors or processing devices may be configured to execute one or more sequences of one or more machine executable instructions contained in a main memory to implement the method(s) or function(s) described herein. Execution of the sequences of instructions contained in a main memory causes the processor to perform at least some of the process steps or function(s) of the elements described herein. One or more processors in a multi-processing arrangement may also be employed to execute the sequences of instructions contained in a main memory or computer-readable medium. In alternative embodiments, hard-wired circuitry may be used in place of or in combination with software instructions. Thus, embodiments are not limited to any specific combination of hardware circuitry and software.

The term "computer-readable medium" as used herein refers to any medium that participates in providing instructions to a processor for execution. Such a medium is non-transitory and may take many forms, including but not limited to, non-volatile media, volatile media, and transmission media. Non-volatile media include, for example, optical or magnetic disks. Volatile media include dynamic memory. Transmission media include coaxial cables, copper wire and fiber optics. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor for execution.

Computer programs comprising machine executable instructions for implementing at least one of the steps of the method described herein or function(s) of various elements of the structural arrangement, including the elements of the de-jamming station, including the elements of the identification device, processor and emitter, described herein can be implemented by one or more computers comprising at least an interface, a physical processor and a non-transitory memory (also broadly referred to as a non-transitory machine readable or storage medium). The computer is a special purpose computer as it is programmed to perform specific steps of the method(s) described above. The non-transitory memory is encoded or programmed with specific code instructions for carrying out the above method(s) and its/their associated steps. The non-transitory memory may be arranged in communication with the physical processor so that the physical processor, in use, reads and executes the specific code instructions embedded in the non-transitory memory. The interface of the special purpose computer may be arranged in communication with the physical processor and receives input parameters that are processed by the physical processor.

It will be appreciated by one skilled in the art that the disclosed arrangements and methods described herein represent a solution to the technological problem described above and currently faced by satellite designers.

The invention claimed is:

1. A de-jamming station for neutralizing the impact of a jamming signal on a satellite, the de-jamming station being configured to be on the ground, the de-jamming station comprising:
    an identification device configured to determine parameters of the jamming signal;
    a processor configured to generate a replica of the jamming signal;
    an emitter configured to broadcast the replica of the jamming signal on the uplink of the satellite.

2. The de-jamming station according to claim 1, further comprising a receiver configured to receive a downlink signal emitted by the satellite.

3. The de-jamming station according to claim 2, wherein the identification device comprises a monitoring device configured to identify a level, a frequency and phase of the jamming signal contained in the downlink signal.

4. The de-jamming station according to claim 2, wherein the identification device further comprises a characterization device configured to identify the nature of the jamming signal contained in the downlink signal.

5. The de-jamming station according to claim 2, wherein the identification device comprises an isolating device configured to isolate the jamming signal contained in the received downlink signal.

6. The de-jamming station according to claim 1, wherein the processor is configured to generate a replica of the jamming signal having the same frequency and amplitude as the jamming signal and being opposite in phase with the jamming signal.

7. The de jamming station according to claim 1, wherein the processor is configured to optimize the replica of the jamming signal in order to minimize the jamming signal contained in the downlink signal emitted by the satellite.

8. A method for neutralizing from the ground the impact of a jamming signal on a satellite, the method comprising:
    identifying parameters of the jamming signal;
    generating a replica of the jamming signal;
    emitting the replica of the jamming signal from the ground on the uplink of the satellite.

9. The method according to claim 8, further comprising receiving a downlink signal emitted by the satellite.

10. The method according to claim 9, further comprising optimizing the replica of the jamming signal in order to minimize the jamming signal contained in the downlink signal emitted by the satellite.

11. The method according to claim 9, wherein the identifying comprises determining a level and a frequency of the jamming signal contained in the downlink signal.

12. The method according to claim 9, wherein the identifying comprises determining the nature of the jamming signal contained in the downlink signal.

13. The method according to claim 9, wherein the identifying comprises filtering the jamming signal contained in the downlink signal.

14. The method according to claim 9, wherein the replica of the jamming signal has the same frequency and amplitude as the jamming signal and is opposite in phase with the jamming signal.

* * * * *

UNITED STATES PATENT AND TRADEMARK OFFICE
CERTIFICATE OF CORRECTION

PATENT NO. : 9,438,372 B2  
APPLICATION NO. : 14/678019  
DATED : September 6, 2016  
INVENTOR(S) : Sonya Amos et al.

Page 1 of 1

It is certified that error appears in the above-identified patent and that said Letters Patent is hereby corrected as shown below:

On the title page, item (56) FOREIGN PATENT DOCUMENTS:

Please correct the foreign reference number to read:

WO     WO 2013/181752 A1     12/2013

Signed and Sealed this  
Twenty-fifth Day of October, 2016

Michelle K. Lee  
*Director of the United States Patent and Trademark Office*